(12) United States Patent
Dunne et al.

(10) Patent No.: US 7,143,346 B2
(45) Date of Patent: Nov. 28, 2006

(54) SIMPLE TYPES IN XML SCHEMA COMPLEX TYPES

(75) Inventors: Sean Dunne, Dublin (IE); Stephen Michael Hanson, Romsey (GB); Suman Kumar Kalia, Maple (CA); Matthew Colin Lovett, Winchester (GB); David Adiel Spriet, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 483 days.

(21) Appl. No.: 10/763,092

(22) Filed: Jan. 22, 2004

(65) Prior Publication Data

US 2004/0261018 A1 Dec. 23, 2004

(30) Foreign Application Priority Data

Jun. 17, 2003 (CA) .................................... 2432658

(51) Int. Cl.
*G06F 17/00* (2006.01)
(52) U.S. Cl. .................... 715/513; 707/102; 707/104.1
(58) Field of Classification Search ................ 715/513, 715/501.1; 707/100–104.1
See application file for complete search history.

(56) References Cited

U.S. PATENT DOCUMENTS

| | | | | |
|---|---|---|---|---|
| 6,336,137 | B1 * | 1/2002 | Lee et al. ..................... | 709/219 |
| 6,366,934 | B1 * | 4/2002 | Cheng et al. ................ | 715/513 |
| 6,418,448 | B1 | 7/2002 | Sarkar ....................... | 707/104.1 |
| 7,043,487 | B1 * | 5/2006 | Krishnamurthy et al. ... | 707/100 |
| 2001/0037460 | A1 * | 11/2001 | Porcari ....................... | 713/201 |
| 2001/0044811 | A1 * | 11/2001 | Ballantyne et al. ......... | 707/513 |
| 2001/0049702 | A1 * | 12/2001 | Najmi ........................ | 707/513 |
| 2002/0029304 | A1 * | 3/2002 | Reynar et al. ............... | 709/332 |
| 2002/0169788 | A1 * | 11/2002 | Lee et al. ................ | 707/104.1 |
| 2002/0184401 | A1 | 12/2002 | Kadel ......................... | 709/315 |

OTHER PUBLICATIONS

Sosnoski,"XML Documents On The Run, Part 2: Better SAX2 handling and the pull-parser alternative", JavaWorld, Mar. 2002, 17 pages.*
Harold,"An Introduction to StAX", Sep. 17, 2003, from XML.com web site, 8 pages.*
Bau,"XML Beans", Mar. 3, 2003, from dev2dev web site, 12 pages.*
RD442010 (Jan. 20, 2001) Data access component framework parses parameter and replaces embedded sub-parameters in specific markup language format with respective equivalent data to generate resultant output string.

(Continued)

*Primary Examiner*—William Bashore
*Assistant Examiner*—James H. Blackwell
(74) *Attorney, Agent, or Firm*—Herman Rodriguez; Diana L Roberts

(57) ABSTRACT

Within the scope of existing XML Schema specifications, an approach is provided to embed simple types within a complex type so an XML stream can have instances of the embedded simple types, even without the presence of XML elements. Because the approach is within the scope of existing XML Schema specifications, the approach is transparent to known XML parsers. With the approach, an XML schema will have a complex type with a mixed flag set to true and an element set to be a dummy element. The dummy element has a simple type and one of (i) a name of the dummy element and (ii) a name of the simple type is one of a predetermined set of names. This XML schema is for use with a parser which, on parsing the schema, will interpret the dummy element as one of an embedded simple type and an inherited simple type.

20 Claims, 1 Drawing Sheet

OTHER PUBLICATIONS

Van der Vlist, E., "Using W3C XML Schema", a tutorial, EC\college\Dag1_papier\TutorialW3CSchemata.doc 06-023-01 10.17, on xml.com.

Hosoya et al. "Word Wide Web and Databases", 3rd Aint. Workshop, Notes in Computer Science vol. 1997, pp. 226-244, Berlin, Germany.

* cited by examiner

SIMPLE TYPES IN XML SCHEMA COMPLEX TYPES

BACKGROUND OF INVENTION

This invention relates to allowing the presence of a simple type in an XML Schema complex type.

Extensible mark-up language (XML) is a mark-up language for documents containing structured information. XML provides a facility to define tags and the structural relationship between them in the document. An XML Schema describes and constrains the content of XML documents.

The W3C XML Schema does not permit a complex type to include a simple type without defining a new element. Also if a complex type inherits from a Simple Type then it can have only simple content, i.e. it cannot have child elements. As a result, it is not possible to model accurately the XML Schema for the following XML stream where the contents of element Fred contains an arbitrary string (xxxx), an element Joe, an integer (67890102), an element Jim and finally an integer (12345).

<Fred>xxxx<Joe/>67890102<Jim/>12345</Fred>

Such types of XML Streams are very common. The XML Schema specification does allow a mixed flag to be set in respect of a complex type so that an instance of the complex type can contain arbitrary strings between the elements. Nevertheless, you cannot precisely specify any order or position for the strings within the XML document, as illustrated in the example above.

This invention seeks to avoid some of the described drawbacks.

SUMMARY OF INVENTION

The present invention describes an XML Schema and a parser for the aforedescribed kinds of XML streams. More specifically, the subject invention seeks to, within the scope of existing XML Schema specifications, provide an approach to embed simple types within a complex type so an XML stream can have instances of the embedded simple types, even without the presence of XML elements. Because the approach is within the scope of existing XML Schema specifications, the approach is transparent to known XML parsers.

According to the present invention, there is provided an XML schema, comprising: at least one complex type, said complex type having a mixed flag set to true and including an element set to be a dummy element, said dummy element having a simple type, one of (i) a name of said dummy element and (ii) a name of said simple type being one of a predetermined set of names for use with a parser which, on parsing said schema, will interpret said dummy element as one of an embedded simple type and an inherited simple type.

According to another aspect of the present invention, there is provided a method of parsing, comprising: receiving an XML stream; parsing said XML stream on encountering a parent element in said XML stream, utilising an XML schema to locate a type for said parent element; where said type is a complex type, determining whether a mixed flag for said complex type in said schema is set to true; where said mixed flag is set to true, interpreting fragments embedded in said parent element in accordance with said complex type, each fragment being one of an arbitrary string and an element; where, in accordance with said complex type, an embedded fragment corresponds to a dummy element having a simple type, with one of (i) a name of said dummy element and (ii) a name of said simple type being one of a predetermined set of names, interpreting said embedded fragment as one of an embedded simple type and an inherited simple type. A computer readable medium containing computer executable instructions to affect the method is also provided.

According to a further aspect of the present invention, there is provided a parser, comprising: means for receiving an XML stream; means for parsing said XML stream means for, on encountering a parent element in said XML stream, utilising an XML schema to locate a type for said parent element; means for, where said type is a complex type, determining whether a mixed flag for said complex type in said schema is set to true; means for, where said mixed flag is set to true, interpreting fragments embedded in said parent element in accordance with said complex type, each fragment being one of an arbitrary string and an element; means for, where, in accordance with said complex type, an embedded fragment corresponds to a dummy element having a simple type, with one of (i) a name of said dummy element and (ii) a name of said simple type being one of a predetermined set of names, interpreting said embedded fragment as an embedded simple type.

Other features and advantages of the invention will become apparent from the following description in conjunction with the drawings.

BRIEF DESCRIPTION OF THE DRAWINGS

The FIGURE, which illustrates an example embodiment of the invention, is a schematic view of a system configured in accordance with this invention.

DETAILED DESCRIPTION

Figure 1:
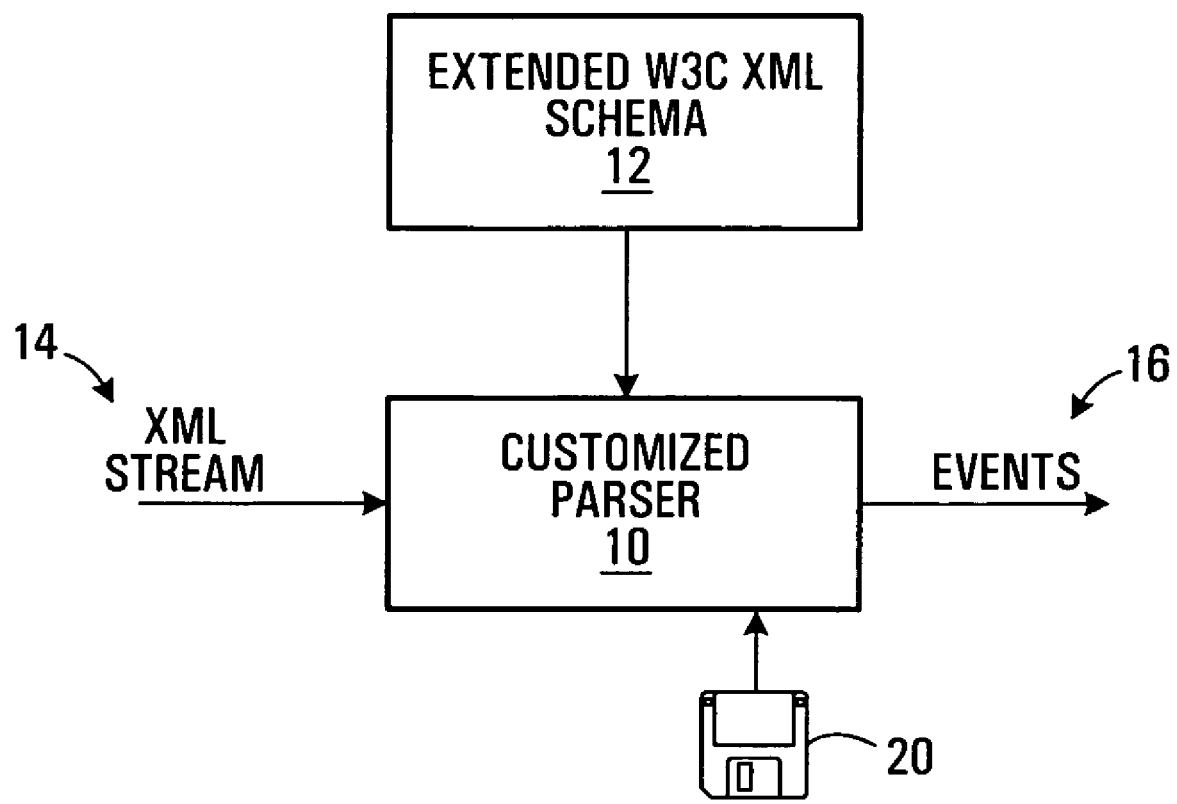

The following approach is used so that, within the scope of existing XML Schema specifications, a mechanism/pattern is provided to embed simple types within a complex type in order that an XML stream can have instances of the embedded simple types, even without the presence of XML elements.

1. Custom simple types are used which extend the XML Schema simple types so a parser operating in accordance with this invention can recognize these special types. Each of these simple types has a name such that the set of these custom simple types provides a set of pre-determined names.

2. The mixed flag is set to true on the embedding complex type.—As per XML Schema specifications, the mixed flag on the complex type indicates that its instance can have arbitrary strings in between the elements.

3. Elements or arbitrary strings of these custom simple types are created within the embedding complex type. These elements/arbitrary strings are wrapped under an anonymous group sequence in which minOccurs and maxOccurs on the sequence is set to 0. As per the XML Schema specification, if both of these flags are set to 0 then the XML instance of the complex type cannot have any occurrence of contents of sequence. In other words, such elements are dummy elements and logically they are not part of the complex type. In consequence, an XML parser which is not configured to operate in accordance with this invention will simply ignore this group. It is noted that the minOccurs and maxOccurs on the elements of these custom simple types have their usual meaning, i.e., they determine whether these elements are optional or mandatory.

By combining these constructs, a special case is created for the custom XML parser (i.e., a parser operating in accordance with this invention) to treat these dummy elements as just the simple types and to parse the arbitrary strings in the instance (a by-product of the mixed declaration defined on the embedding complex type) according to the defined type of the element.

Since the declaration of these dummy elements, wrapped under an anonymous group within the complex type, may be positional (by use of the "sequence" construct), the custom XML parser can ensure that such arbitrary strings in the XML instance adhere to the relative position of the declaration of these dummy elements in the complex type.

The XML instance generated for the complex type (containing these dummy elements) will parse successfully by any open source XML Schema complaint parser because it will contain arbitrary strings at the position where the dummy elements are defined; this is OK because the mixed flag on the complex type is set to true.

The following schema contains Customized Simple types to enable embedding of a simple type within a complex type and extending from a simple type.

Types starting with name ComIbmMrmBaseValuexxxx are to be used in the scenario where a complex type extends a simple type.

Types starting with name ComIbmMrmAnonxxx are to be used in the scenario where a complex type includes a simple type.

The reference to "wmqi21" in the example is simply a reference to the customized parser (i.e., the parser operating in accordance with this invention).

```
<?xml version="1.0" encoding="UTF-8"?>
<xsd:schema xmlns:xsd="http://www.w3.org/2001/XMLSchema">
    <xsd:annotation>
        <xsd:documentation>
            ComIbmMrm_BaseValuexxx type to be used when a
complex type extends a simple type
        </xsd:documentation>
    </xsd:annotation>
    <xsd:simpleType name="ComIbmMrm_BaseValueString">
        <xsd:restriction base="xsd:string"></xsd:restriction>
    </xsd:simpleType>
    <xsd:simpleType name="ComIbmMrm_BaseValueInt">
        <xsd:restriction base="xsd:int"></xsd:restriction>
    </xsd:simpleType>
    <xsd:simpleType name="ComIbmMrm_BaseValueDateTime">
        <xsd:restriction base="xsd:dateTime"></xsd:restriction>
    </xsd:simpleType>
    <xsd:simpleType name="ComIbmMrm_BaseValueDate">
        <xsd:restriction base="xsd:date"></xsd:restriction>
    </xsd:simpleType>
    <xsd:simpleType name="ComIbmMrm_BaseValueTime">
        <xsd:restriction base="xsd:time"></xsd:restriction>
    </xsd:simpleType>
    <xsd:simpleType name="ComIbmMrm_BaseValueFloat">
        <xsd:restriction base="xsd:float"></xsd:restriction>
    </xsd:simpleType>
    <xsd:simpleType name="ComIbmMrm_BaseValueDecimal">
        <xsd:restriction base="xsd:decimal"></xsd:restriction>
    </xsd:simpleType>
    <xsd:simpleType name="ComIbmMrm_BaseValueBoolean">
        <xsd:restriction base="xsd:boolean"></xsd:restriction>
    </xsd:simpleType>
    <xsd:simpleType name="ComIbmMrm_BaseValueBinary">
        <xsd:restriction base="xsd:hexBinary"></xsd:restriction>
    </xsd:simpleType>
    <xsd:simpleType name="ComIbmMrm_BaseValueGYear">
        <xsd:restriction base="xsd:gYear"></xsd:restriction>
    </xsd:simpleType>
    <xsd:simpleType name="ComIbmMrm_BaseValueGYearMonth">
        <xsd:restriction base="xsd:gYearMonth"></xsd:restriction>
    </xsd:simpleType>
    <xsd:simpleType name="ComIbmMrm_BaseValueGMonth">
        <xsd:restriction base="xsd:gMonth"></xsd:restriction>
    </xsd:simpleType>
    <xsd:simpleType name="ComIbmMrm_BaseValueGMonthDay">
        <xsd:restriction base="xsd:gMonthDay"></xsd:restriction>
    </xsd:simpleType>
    <xsd:simpleType name="ComIbmMrm_BaseValueGDay">
        <xsd:restriction base="xsd:gDay"></xsd:restriction>
    </xsd:simpleType>
    <xsd:annotation>
        <xsd:documentation>
            ComIbmMrm_Anonymous_xxx type to be used when a
complex type includes a simple type
        </xsd:documentation>
    </xsd:annotation>
    <xsd:simpleType name="ComIbmMrm_AnonString">
        <xsd:restriction base="xsd:string"></xsd:restriction>
    </xsd:simpleType>
    <xsd:simpleType name="ComIbmMrm_AnonInt">
        <xsd:restriction base="xsd:int"></xsd:restriction>
    </xsd:simpleType>
<xsd:simpleType name="ComIbmMrm_AnonDateTime">
        <xsd:restriction base="xsd:dateTime"></xsd:restriction>
    </xsd:simpleType>
    <xsd:simpleType name="ComIbmMrm_AnonFloat">
        <xsd:restriction base="xsd:float"></xsd:restriction>
    </xsd:simpleType>
    <xsd:simpleType name="ComIbmMrm_AnonDecimal">
        <xsd:restriction base="xsd:decimal"></xsd:restriction>
    </xsd:simpleType>
    <xsd:simpleType name="ComIbmMrm_AnonBoolean">
        <xsd:restriction base="xsd:boolean"></xsd:restriction>
    </xsd:simpleType>
    <xsd:simpleType name="ComIbmMrm_AnonBinary">
        <xsd:restriction base="xsd:hexBinary"></xsd:restriction>
    </xsd:simpleType>
</xsd:schema>
```

EXAMPLE

The following example shows the equivalent XML Schema representation for a complex type, which extends a simple type String and includes a simple type Integer.

```
<?xml version="1.0" encoding="UTF-8"?>
<schema xmlns="http://www.w3.org/2001/XMLSchema"
    targetNamespace="http://www.ibm.com"
    xmlns:wmqi21Example="http://www.ibm.com">
    <annotation>
        <documentation>
        MRMSequenceExtendingBaseTypeAndIncludingSimpleType
        MRMChoiceExtendingBaseTypeAndIncludingSimpleType
            They extend from a simple type String and include
        simple type Integer
        </documentation>
    </annotation>
    <include schemaLocation="wmqi21.xsd" />
    <complexType
    name="MRMSequenceExtendingBaseTypeAndIncludingSimple-
Type"
    mixed="true">
        <sequence>
            <sequence minOccurs="0" maxOccurs="0">
                <element
name="dummy_elem_string_inheritence"
type="wmqi21Example:ComIbmMrm_BaseValueString" minOccurs="1"
maxOccurs="1"></element>
            </sequence>
            <element name="elem1" type="string"></element>
```

-continued

```
        <sequence minOccurs="0" maxOccurs="0">
            <element name="dummy_elem_included_type_int"
type="wmqi21Example:ComIbmMrm_AnonInt" minOccurs="0"
maxOccurs="1"></element>
        </sequence>
            <element name="elem2" type="integer"></element>
        </sequence>
    </complexType>
    <complexType
name="MRMChoiceExtendingBaseTypeAndIncludingSimpleType"
mixed="true">
        <sequence>
            <sequence minOccurs="0" maxOccurs="0">
                <element
name="dummy_elem_string_inheritance"
type="wmqi21Example:ComIbmMrm_BaseValueString" minOccurs="1"
maxOccurs="1"></element>
            </sequence>
            <choice>
                <element name="elem3"
type="string"></element>
                <sequence minOccurs="0" maxOccurs="0">
                    <element
name="dummy_elem_included_type_int"
type="wmqi21Example:ComIbmMrm_AnonInt" minOccurs="0"
maxOccurs="1"></element>
                </sequence>
                <element name="elem4"
type="integer"></element>
            </choice>
        </sequence>
    </complexType>
    <element name="mrmSequenceElement"
type="wmqi21Example:MRMSequenceExtendingBaseTypeAndIncluding
SimpleType"></element>
    <element name="mrmChoiceElement"
type="wmqi21Example:MRMChoiceExtendingBaseTypeAndIncluding
SimpleType"></element>
</schema>
```

Here is the instance document pertaining to mrmSequenceElement whose type is MRMSequenceExtendingBaseTypeAndIncludingSimpleType. Note that the dummy_elem_string_inheritance mirrors the inheritance from simple type String and 0123456 mirrors the inclusion of simple type int.

```
<?xml version="1.0" encoding="UTF-8"?>
<wmqi21Example:mrmSequenceElement
xmlns:wmqi21Example="http://www.ibm.com"
    xmlns:xsi="http://www.w3.org/2001/XMLSchema-instance"
    xsi:schemaLocation="http://www.ibm.com
wmqi21Example.xsd ">
    dummy_elem_string_inheritance
    <elem1>elem1</elem1>
    0123456
    <elem2>0</elem2>
</wmqi21Example:mrmSequenceElement>
```

The following is the instance document pertaining to mrmChoiceElement whose type is MRMChoiceExtendingBaseTypeAndIncludingSimpleType. Note that the dummy_elem_string_inheritance mirrors the inheritance from simple type String. Due to the choice construct, only elem3 is present in the instance document.

```
<?xml version="1.0" encoding="UTF-8"?>
<wmqi21Example:mrmChoiceElement
xmlns:wmqi21Example="http://www.ibm.com"
    xmlns:xsi="http://www.w3.org/2001/XMLSChema-instance"
    xsi:schemaLocation="http://www.ibm.com wmqi21Example .xsd ">
```

```
    dummy_elem_string_inheritance
    <elem3>elem3</elem3>
</wmqi21Example:mrmChoiceElement>
```

Note that both of the above instance documents are valid because the mixed flag was set to true on their respective complex types.

The FIGURE illustrates an example system employing this invention. A customized parser 10, (which may be any known parser capable of handling the W3C XML schema, modified to operate as aforedescribed) has available to it the extended W3C XML schema 12. The extended W3C XML schema extends the standard W3C XML schema with the aforenoted customized simple types. In operation, an XML stream 14 inputs the parser 10, causing the parser to generate events 16. The customized parser 10 may be a processor loaded with software from a computer readable medium 20, such as a diskette, CD-ROM, memory chip, or a file downloaded from a remote source.

Rather than wrapping elements of the custom simple types in a group with minOccurs and maxOccurs set to zero in order to ensure that a "regular" XML parser (i.e., an XML Schema compliant parser which is not configured to operate in accordance with this invention) will ignore these elements, an alternate approach may be used. More specifically, the minOccurs and maxOccurs of each of these elements is set to zero. Thus, a "regular" parser will ignore these elements. However, an annotation statement (which will also be ignored by a "regular" parser) is employed to give the parser of this invention the information as to the "real" minOccurs and maxOccurs of each of these elements. The customized parser recognizes this information by virtue of the use of an "appinfo" statement in the annotation.

This pattern is used for a complex type that has the content model set to "all" group (which does not allow sequence or choice group elements). In this case the dummy element is embedded inside "all" group.

The dummy element pertaining to the inheritance of simple type is best placed as the very first element in the complex type. For the complex type having the content model "choice", the top level content model is set to sequence, the dummy element pertaining to inheritance of simple type is best placed as the first element, and the actual choice content follows the dummy element, as illustrated in the type MRMChoiceExtendingBaseTypeAndIncludingSimpleType in the following example.

```
<?xml version="1.0" encoding="UTF-8"?>
<schema xmlns="http://www.w3.org/2001/XMLSchema"
    targetNamespace="htp://www.ibm.com"
mlns:wmqi21Example="http://www.ibm.com">
    <annotation>
        <documentation>
    MRMSequenceExtendingBaseTypeAndIncludingSimpleType
        MRMChoiceExtendingBaseTypeAndIncludingSimpleType
        they extend from a simple type String and it
    include simple type Integer
        </documentation>
    </annotation>
    <include schemaLocation="wmqi21.xsd" />
    <complexType
    name="MRMSequenceExtendingBaseTypeAndIncludingSimple-
Type"
    mixed="true">
```

-continued

```
        <sequence>
            <element name="dummy_elem_string_inheritence"
type="wmqi21Example:ComIbmMrm_BaseValueString"
minOccurs="0" maxOccurs="0" />
            <element name="elem1" type="string" />
                <element name="dummy_elem_included_type_int"
type="wmqi21Example:ComIbmMrm_AnonInt" minOccurs="0"
maxOccurs="0">
                <annotation>
                    <appinfo
source="WMQI_APPINFO">MinOccurs=0,MaxOccurs=1</appinfo>
                </annotation>
            </element>
            <element name="elem2"
type="integer"></element>
        </sequence>
</complexType>
<complexType
name="MRMChoiceExtendingBaseTypeAndIncludingSimpleType"
mixed="true">
    <sequence>
        <element
name="dummy_elem_string_inheritence"
            type="wmqi21Example:ComIbmMrm_BaseValueString"
            minOccurs="0" maxOccurs="0"></element>
            <choice>
                <element name="elem3" type="string" />
                <element
name="dummy_elem_included_type_int"
type="wmqi21Example:ComIbmMrm_AnonInt" minOccurs="0"
maxOccurs="0"
                <annotation>
<appinfo>MinOccurs=0,MaxOccurs=1</appinfo>
                </annotation>
            </element>
                <element name="elem4"
type="integer"></element>
            </choice>
        </sequence>
</complexType>
<element name="mrmSequenceElement"
    type="wmqi21Example:MRMSequenceExtendingBaseTypeAnd-
    Including
    SimpleType"></element>
<element name="mrmChoiceElement"
type="wmqi21Example:MRMChoiceExtendingBaseTypeAndIncluding-
SimpleType"></element>
</schema>
```

As an alternative to providing each custom simple type with a name that will be recognized by the custom parser as indicating one of an embedded simple type or an inherited simple type, the name of the dummy element can be used for this purpose. Thus, there would be a set of names for dummy elements, each name representing one custom simple type.

Other modifications will be apparent to those skilled in the art and, therefore, the invention is defined in the claims.

What is claimed is:

1. A method of parsing an XML stream containing simple types wherein said simple types are not XML elements within a complex type, said method comprising:
   receiving said XML stream;
   parsing said XML stream comprising:
   on encountering a parent element in said XML stream, utilizing an XML schema to locate a type for said parent element;
   where said type is a complex type, determining whether a mixed flag for said complex type in said schema is set to true;
   where said mixed flag is set to true, interpreting fragments embedded in said parent element in accordance with said complex type, each fragment being one of an arbitrary string and an element;
   generating parser output events interpreting each embedded fragment as one of an embedded simple type and an inherited simple type where, in accordance with said complex type, each embedded fragment corresponds to a dummy element having a simple type, with one of (i) a name of said dummy element and (ii) a name of said simple type being one of a predetermined set of names.

2. The method of claim 1 wherein said embedded fragment is considered to correspond to a dummy element when minimum and maximum occurrences of an element in said schema corresponding with said embedded fragment are set to zero.

3. The method of claim 1 wherein said embedded fragment is considered to correspond to a dummy element when an element in said schema corresponding with said embedded fragment is incorporated in a local group, said local group having its minimum and maximum occurrences set to zero.

4. The method of claim 3 wherein said embedded fragment is interpreted as an embedded simple type and further comprising using minimum and maximum occurrences of said dummy element to determine whether said dummy element is mandatory or optional.

5. The method of claim 2 wherein said embedded fragment is interpreted as an embedded simple type and further comprising using an application annotation associated with said dummy element to determine whether said dummy element is mandatory or optional.

6. The method of claim 2 wherein said complex type has a sequence construct, said dummy element appearing in a pre-selected position within said sequence construct, whereby the position of an instance of said dummy element in an XML stream may be specified in said schema.

7. The method of claim 2 wherein said simple type name is one of said predetermined set of names, said simple type extending a basic simple type.

8. The method of claim 7 wherein said basic simple type is one of a string, integer, floating point number, date, time, decimal number.

9. The method of claim 2 wherein said XML schema specifies the position of an instance of said dummy element in any XML stream of said complex type, and further comprising using said XML schema to locate said embedded element that corresponds to said dummy element.

10. The method of claim 9 wherein said simple type is an inherited simple type and said dummy element is located as the first element in said complex type.

11. A parser for parsing an XML stream containing simple types wherein said simple types are not XML elements within a complex type, said parser comprising:
   means for receiving an XML stream;
   means for parsing said XML stream comprising;
   means for, on encountering a parent elements in said XML stream, utilizing an XML schema to locate a type for said parent element;
   means for, where said type is a complex type, determining whether a mixed flag for said complex type in said schema is set to true;
   means for, where said mixed flag is set to true, interpreting fragments embedded in said parent element in accordance with said complex type, each fragment being one of an arbitrary string and an element;
   means for generating parse output events interpreting each embedded fragment as one of an embedded simple type and an inherited simple type, where, in accordance with said complex type, each embedded fragment corresponds to a dummy element having a simple type, with one of (i) a name of said dummy element and (ii) a name of said simple type being one of a predetermined set of names.

12. The parser of claim 11 wherein said means for interpreting said embedded fragment as an embedded simple type determines an embedded fragment corresponds to a dummy element when minimum and maximum occurrences of an element in said schema corresponding with said embedded fragment are set to zero.

13. The parser of claim 11 wherein said means for interpreting said embedded fragment as an embedded simple type determines said embedded fragment corresponds to a dummy element when an element in said schema corresponding with said embedded fragment is incorporated in a local group, said local group having its minimum and maximum occurrences set to zero.

14. The parser of claim 13 further comprising means for, where said embedded fragment is interpreted as an embedded simple type, using minimum and maximum occurrences of said dummy element to determine whether said dummy element is mandatory or optional.

15. The parser of claim 12 further comprising means for, where said embedded fragment is interpreted as an embedded simple type, using an application annotation associated with said dummy element to determine whether said dummy element is mandatory or optional.

16. The parser of claim 12 wherein said simple type name is one of said predetermined set of names, said simple type extending a basic simple type.

17. The parser of claim 16 wherein said basic simple type is one of a string, integer, floating point number, date, time, and decimal number.

18. The parser of claim 12 wherein said XML schema specifies the position of an instance of said dummy element in any XML stream of said complex type, and further comprising means for using said XML schema to locate said embedded element that corresponds to said dummy element.

19. The parser of claim 18 wherein said simple type is an inherited simple type and said dummy element is located as the first element in said complex type.

20. A computer readable medium containing computer executable instructions, which when executed by a processor, cause said processor to undertake a method for parsing an XML stream containing simple types wherein said simple types are not XML elements within a complex type, said method comprising:

receiving said XML stream;

parsing said XML stream comprising:

on encountering a parent element in said XML stream, utilizing an XML schema to locate a type for said parent element;

where said type is a complex type, determining whether a mixed flag for said complex type in said schema is set to true;

where said mixed flag is set to true, interpreting fragments embedded in said parent element in accordance with said complex type, each fragment being one of an arbitrary string and an element;

generating parser output events interpreting each embedded fragment as one of an embedded simple type and an inherited simple type where, in accordance with said complex type, each embedded fragment corresponds to a dummy element having a simple type, with one of (i) a name of said dummy element and (ii) a name of said simple type being one of a predetermined set of names.

* * * * *